Jan. 3, 1956  R. STEVENSON  2,729,228
AUTOMATIC AIR BLEEDER VALVE FOR HYDRAULIC SYSTEMS
Filed April 1, 1952
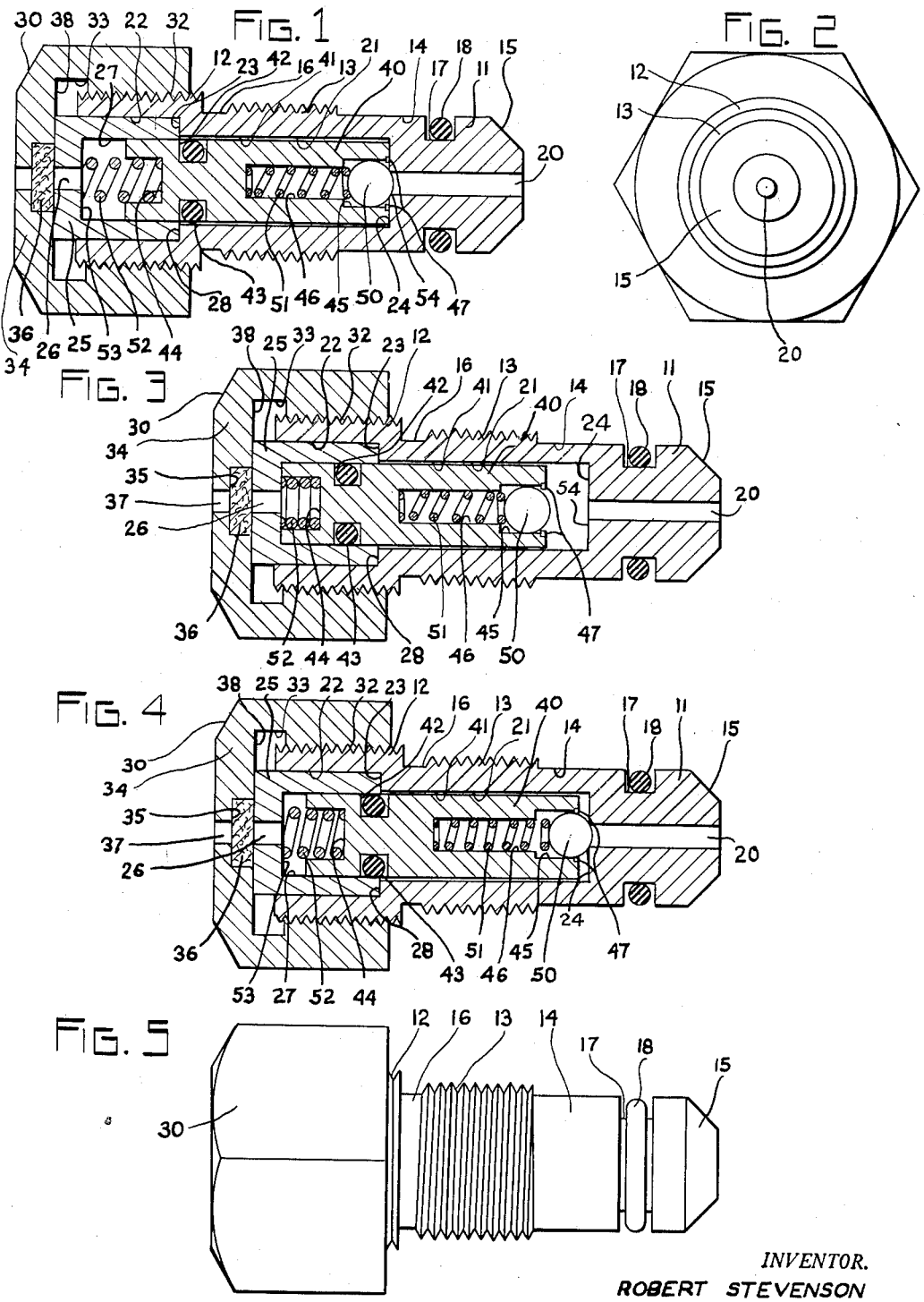
INVENTOR.
ROBERT STEVENSON
BY
William Frederick Werner
ATTORNEY

United States Patent Office 2,729,228
Patented Jan. 3, 1956

2,729,228
AUTOMATIC AIR BLEEDER VALVE FOR HYDRAULIC SYSTEMS

Robert Stevenson, Barrington, R. I., assignor to Anco, Inc., a corporation of Rhode Island Application April 1, 1952, Serial No. 279,860

4 Claims. (Cl. 137—199)

This invention relates to an automatic air bleeder valve for hydraulic systems and more particularly to a mechanism for automatically allowing entrapped air or gases to escape from hydraulic systems and to prevent air from re-entering the system through the bleeder valve.

This invention is an improvement over my Patent 2,684,684 which issued on July 27, 1954.

One of the objects of the present invention is to provide an automatic air bleeder valve in a hydraulic system to permit the escape of the air which accumulates when fluid is added to the system and to prevent entrapped air from re-entering the system through the medium of the bleeder valve.

Another object of the present invention is to provide an automatic air bleeder valve in which the air re-entering the valve is filtered, thereby preventing dirt from impeding the valves' function or entering the hydraulic system.

And still another object of the present invention is to provide a positive acting, inexpensive, foolproof air bleeder capable of mass production on the fastest operating production equipment.

Other objects of this invention will be pointed out in part and become apparent in part in the following specification and claims.

Inasmuch as air bleeder valves incorporate a reciprocating piston operating in the atmosphere and not a vacuum; it follows that the piston will draw a small amount of air, back into the piston cylinder. This improvement filters the air drawn back into the cylinder and reduces to a nullity the amount of air re-entering the system while at the same time preventing fluid from leaking out of the system through the air bleeder valve.

Like reference numerals refer to like parts in the accompanying drawings in which:

Figure 1 is a longitudinal sectional view of the new and improved automatic air bleeder valve showing the piston in position when air is escaping through the valve.

Figure 2 is a right hand end view in elevation.

Figure 3 is a longitudinal sectional view similar to Figure 1, showing the piston in position when the valve is fluid tight.

Figure 4 is a longitudinal sectional view similar to Figure 3, showing the piston in position when air enters the cylinder preparatory to escaping.

Figure 5 is a side elevational view of the new and improved automatic air bleeder valve for hydraulic systems.

Referring to the drawings wherein a valve body 11 having an external stepped formation, consisting of a threaded area 12 on its largest diameter and a threaded area 13 on its intermediate diameter with a machined end 14 on its smallest diameter terminating in a beveled surface 15. In accordance with standard manufacturing practices a separating ring 16 separates threaded area 13 from the step provided with threaded area 12. A groove 17 is provided in end 14 to house a fluid tight packing of any standard manufacture but for purposes of illustration an O ring packing 18 is shown.

Internally, valve body 11 is provided with a bore throughout its length in stepped formation consisting of an entering port 20 adjacent a piston cylinder 21 which terminates in a bushing retaining chamber 22. Thus, a shoulder 23 is formed between cylinder 21 and chamber 22, and a wall 24 is formed between port 20 and cylinder 21.

A cup shaped bushing 25 provided with an air escape port 26 is secured in bushing retaining chamber 22 with its base 28 abutting shoulder 23. Its inside diameter 27 is slightly smaller than the diameter of piston cylinder 21 to provide a fluid tight seal when cooperating with a fluid tight packing, hereinafter described.

A retaining nut 30 hexagonal in shape (see Figure 2) is provided with screw threads 32 adapted to mesh with threaded area 12. A relief ring 33 adjacent threads 32 provides clearance for the end of the step having threaded area 12. The base 34 of nut 30 is provided with a counterbored area 35 adapted to house a filter 36. An auxiliary air escape port 37 located in base 34 is in general alignment with air escape port 26 with filter 36 interposed between them. The inside face 38 of base 34 retains bushing 25 in operative position.

A piston 40 is provided with an outside diameter 41 having an annular groove 42 adapted to house any conventional fluid tight packing. For purposes of illustration an O ring packing 43 is shown. The fluid tight packing 43 is manufactured to provide a sealing fit in cooperation with inside diameter 27 and a non-sealing fit when cooperating with piston cylinder 21.

The internal structure of piston 40 consists of a spring retaining cavity 44 on one end and a ball retaining annular recess 45 terminating in a spring retaining bore 46 on the opposite end. The annular recess 45 is provided with clinch pins 47 which retain ball 50 in annular recess 45 under the influence of spring 51 retained in bore 46.

Spring 52 housed in spring retaining cavity 44 urges piston 40 toward entering port 20 by having one end of spring 52 resting against the end wall 53 of bushing 25. Wall 24 at the juncture of entering port 20 forms a valve seat 54 for ball 50. Threads 13, and end 14 and packing 18 are adapted to cooperate with any conventional hydraulic fitting; not shown.

In operation the new and improved automatic air bleeder valve will function as follows: It will be placed in the conventional fitting of any hydraulic system with entering port 20 in alignment with the fluid conduit preferably in a vertical position in the highest point in the system. Fluid under pressure will enter port 20 and pass into piston cylinder 21. In so doing, the fluid will act on ball 50 and the base of spring retaining bore 46 thereby forcing piston 40 rearward to the position shown in Figure 3 wherein packing 43 forms a fluid tight seal with inside diameter 27. It is obvious that the fluid pressure must overcome spring 52.

The piston 40 will remain in this position so long as the fluid pressure does not drop below the force of spring 52, when it does, piston 40 will move to the position shown in Figure 1 with ball 50 engaging seat 54. In this position when air is to escape, the air in the system will force piston 40 to the position shown in Figure 4 wherein ball 50 is forced away from seat 54 and piston 40 is forced into a position where packing 43 is about to engage internal diameter 27 with a sealing fit, but the sequence of operation is that packing 43 is still positioned in a non-sealing position. Air in the meantime will have passed between ball 50 and seat 54 and between wall 24 and the end of piston 40 to the clearance between piston cylinder 21 and outside diameter 41 on past packing 43 and between inside diameter 27 and outside diameter 41 into air escape port 26 through filter 36 and auxiliary air escape port 37 into the atmosphere.

Just as soon as the fluid can once again exert its force on ball 50 and the base of spring retaining bore 46, the piston 40 will move rearwardly against the tension of spring 52. However, as piston 40 starts rearwardly spring 51 will force ball 50 against seat 54 sealing off any backward movement of fluid entering port 20. See Figure 4. In the same way, piston 40 in its forward movement under the influence of spring 52 will suck a little air back through auxiliary air escape port 37, past filter 36, air escape port 26, and the clearance between inside diameter 27 and outside diameter 41 until it reaches the film of fluid surrounding piston 40. The filter is interposed to exclude dust and dirt from entering between diameters 27 and 41. This air in past valve bleeders found its way back into the hydraulic system via entering port 20 especially when the fluid pressure was zero, as when the system was idle. Spring 51 acting on ball 50 contacting valve seat 54 now prevents this undesirable condition of air entering the system.

What I claim is:

1. In an automatic air bleeder valve for hydraulic systems, a valve body having an external stepped formation, consisting of a threaded area on the largest and intermediate diameters with a separating ring on the intermediate diameter adjacent the largest diameter and a machined end on the smallest diameter, a groove in said smallest diameter, a fluid tight packing in said groove, internally, said valve body is provided with a bore throughout its length in stepped formation consisting of an entering port adjacent a piston cylinder which terminates in a bushing retaining chamber, a shoulder formed between said piston cylinder and said bushing retaining chamber, a wall formed between said entering port and said piston cylinder, a valve seat formed at the juncture of said entering port and said wall, a bushing provided with an inside diameter and, having an air escape port, secured in said bushing retaining chamber with its base abutting said shoulder, a retaining nut, provided with screw threads adapted to mesh with said threaded area on the largest diameter of said valve body, a relief ring adjacent said threads, a counterbored area in the base of said nut, a filter, housed in said counterbored area, an auxiliary air escape port in said base adjacent said counterbored area and aligned with said air escape port in said bushing, the base of said nut abutting said bushing, a piston provided with an annular groove in its outside diameter slidably mounted in said piston cylinder and the inside diameter of said bushing, a fluid tight packing housed in said annular groove adapted to cooperate with the inside diameter of said bushing to form a fluid tight seal and with the piston cylinder to form a non-fluid tight seal, a spring retaining cavity in one end of said piston, a ball retaining annular recess terminating in a spring retainig bore in the opposite end of said piston, a ball in said ball retaining annular recess, clinch pins in said ball retaining annular recess abutting said ball, a spring in said spring retaining bore abutting the base of said spring retaining bore on one end and said ball with its opposite end, and a spring in said spring retaining cavity abutting the base of said cavity with one end and abutting said bushing with its other end said ball cooperating with said valve seat to form a fluid tight seal when said piston is influenced by the spring in said spring retaining cavity during a drop in hydraulic pressure in said hydraulic system.

2. An automatic air bleeder valve for hydraulic systems having in combination a valve body centrally apertured to present shouldered cylindrical portions of progressively greater diameter from one end to the other end, a bushing fixed in the cylindrical portion of largest diameter of said valve body, said bushing having an outlet escape port and an internal diameter slightly smaller than the diameter of the succeeding cylindrical portion of said valve body, a piston movable lengthwise within said bushing and said internal diameter, an annular groove in said piston, a fluid tight packing in said groove adapted to form a fluid tight seal with said bushing when said packing is under the influence of hydraulic fluid under pressure in said hydraulic system, a spring retaining cavity in one end of said piston, a spring in said spring retaining cavity abutting said bushing on one end and the base of said spring retaining cavity with the other end, a ball retaining annular recess terminating in a spring retaining bore in the other end of said piston, a ball located in said ball retaining annular recess, clinch pins in said ball retaining annular recess abutting said ball, a spring in said spring retaining bore abutting the base of said spring retaining bore on one end and said ball with its opposite end, a retaining nut, means for securing said retaining nut to said valve body, an air escape port adjacent a counterbored area in said retaining nut, an air filter located in said counterbored area, and means on said valve body for securing said valve body to a hydraulic system.

3. In an automatic air bleeder valve for a hydraulic system, a valve body having means for locating said automatic air bleeder valve at the top of said hydraulic system in fluid tight relationship and having an internal bore throughout its length of stepped formation consisting of entering port adjacent a piston cylinder which terminates in a bushing retaining chamber, a valve seat in said entering port, a bushing provided with an inside diameter smaller than the piston cylinder and having an air escape port secured in said bushing retaining chamber, a retaining nut having means to be secured to said valve body, provided with a counterbored area and an auxiliary air escape port in its base abutting said bushing, a filter secured in said counterbored area, a piston movable in said piston cylinder and the inside diameter of said bushing provided with an annular groove in its outside diameter, a fluid tight packing housed in said annular groove adapted to cooperate with the inside diameter of said bushing to form a fluid tight seal with the piston in one position and a non-fluid tight seal with the piston in the other position having the fluid tight packing in said piston cylinder, a spring retaining cavity in one end of said piston, a spring located in said spring retaining cavity, a ball retaining annular recess terminating in a spring retaining bore in the opposite end of said piston, a ball, means to retain said ball in said ball retaining annular recess, a spring located in said spring retaining bore, said ball normally positioned away from said valve seat under the influence of hydraulic fluid pressure, and will be positioned against said valve seat whenever a reduction of pressure of said hydraulic fluid occurs and air is to be vented from the system.

4. In an automatic air bleeder valve for a hydraulic system, a valve body having means for locating in the highest conduit of a hydraulic system and provided with an internal bore throughout its length, a bushing having a bore with a diameter smaller than the diameter of said internal bore and having an air escape port secured in one end of said internal bore, a retaining nut having means to be secured to said valve body and retaining said bushing in said internal bore, said retaining nut being provided with a counterbored area and an auxiliary air escape port in alignment with said air escape port in said bushing, a filter secured in said counterbored area, a piston movable in said internal bore and said bore in said bushing having a spring retaining cavity in one end and a spring retaining bore in the opposite end, slidably mounted in said bushing and said internal bore, a fluid tight packing between said piston and said bushing effecting a sealing and non-sealing condition depending upon the position of the piston in said internal bore and said bore in said bushing, springs located in said spring retaining cavity and in said spring retaining bore, a ball located in said spring retaining bore, means to retain said ball in said spring retaining bore, an inlet in said valve body, a valve seat in said inlet, said ball normally engaging said valve set when the fluid pressure in said hydraulic system is less than the tension of the spring in said spring retaining bore.

References Cited in the file of this patent

UNITED STATES PATENTS

| 1,749,128 | Buss | Mar. 4, 1930 |
| 1,884,548 | Boynton | Oct. 25, 1932 |
| 2,046,228 | Wiedmann et al. | June 30, 1936 |
| 2,481,713 | Bertea | Sept. 13, 1949 |
| 2,602,462 | Barrett | July 8, 1952 |